Dec. 29, 1970  A. BILCO  3,550,471
MANUAL CONTROL DETENT APPARATUS
Filed Nov. 12, 1968  3 Sheets-Sheet 3

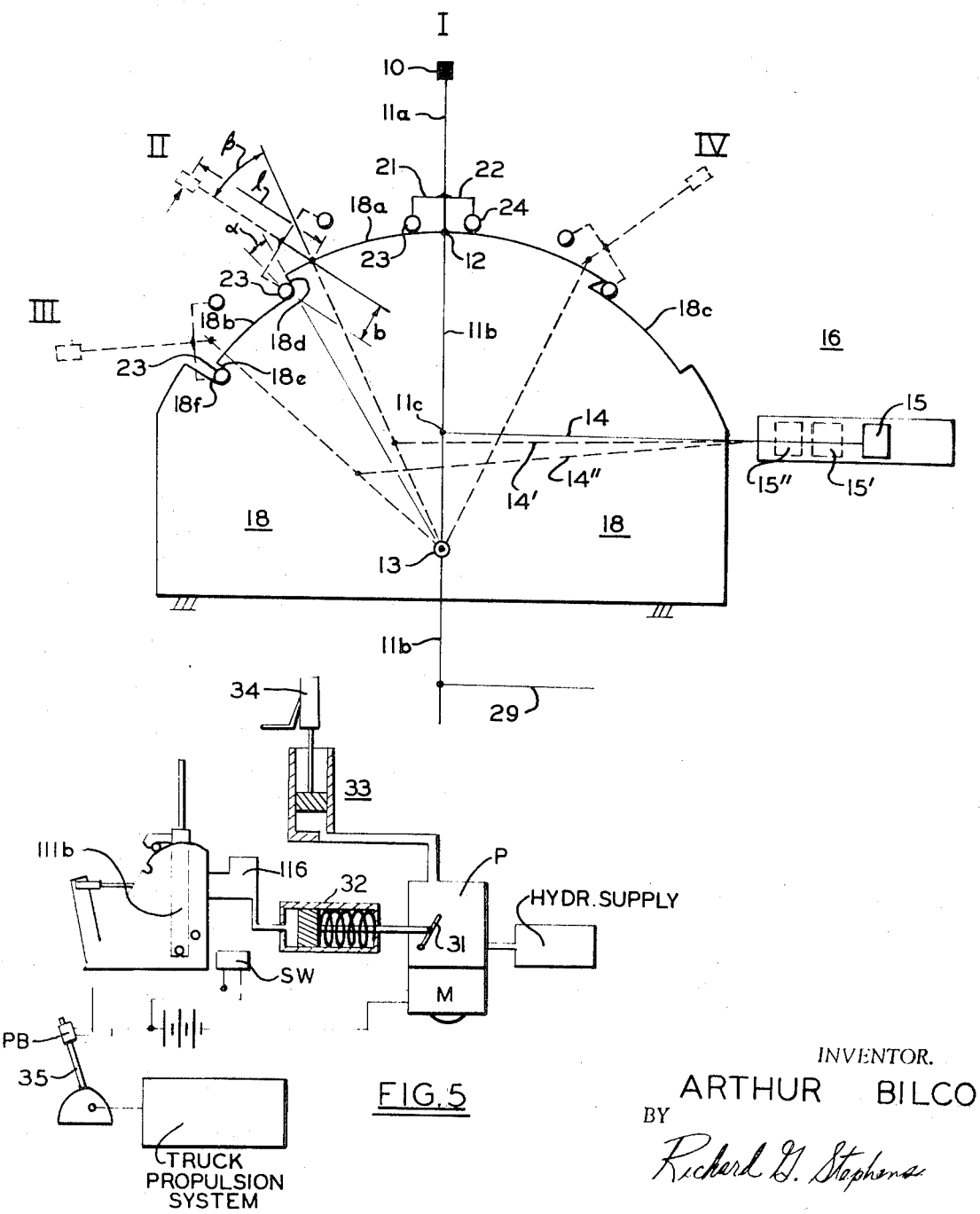

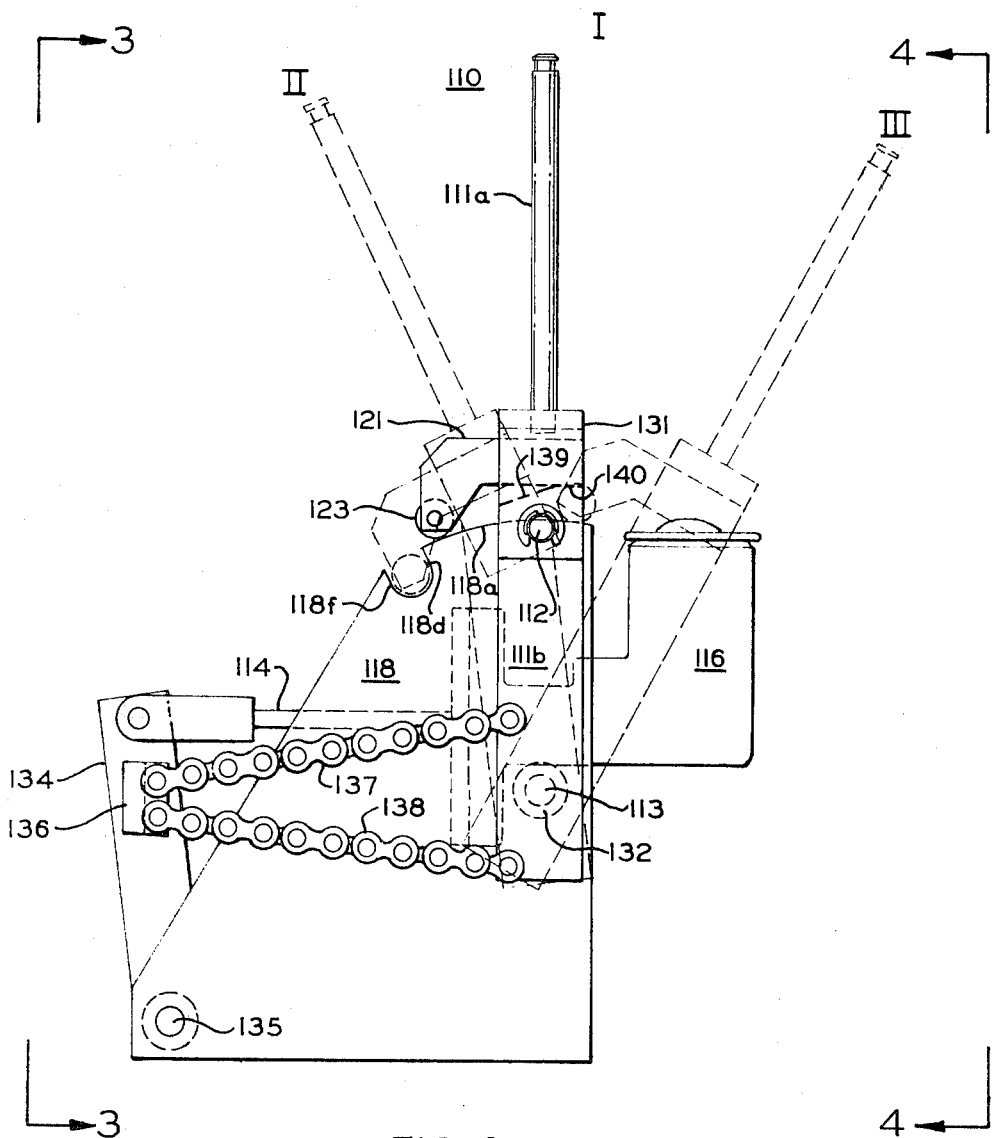

INVENTOR.
ARTHUR BILCO
BY

United States Patent Office 3,550,471
Patented Dec. 29, 1970

3,550,471
MANUAL CONTROL DETENT APPARATUS
Arthur Bilco, Greene, N.Y., assignor to The Raymond Corporation, a corporation of New York
Filed Nov. 12, 1968, Ser. No. 774,904
Int. Cl. G05g 5/02
U.S. Cl. 74—529   8 Claims

ABSTRACT OF THE DISCLOSURE

A latching arrangement for a manual control which holds the control in a predetermined position against opposing reactive forces without friction means, and in which operator effort to unlatch the control is made substantially independent of the amount of reactive force applied to the control. The manual control is shown arranged to control a hydraulic system which controls the raising of the load carriage of a fork lift truck.

This invention relates to manually-positioned controls, and more particularly to improved arrangements to allow manual controls to be positioned easily and held securely at one or more predetermined positions. A wide variety of devices include elements such as hydraulic valves or piston devices, for example, which must be positioned by an operator to various positions to control the operation of various devices, and in many applications is either necessary or desirable that an operator be enabled to position a manual control to a predetermined position and have the control remain securely held in such a position until the operator deliberately moves the control to a different position. Often such a control must position an element, such as a hydraulic valve or piston which receives reactive forces tending to move the control from an operator-selected position. Such reactive forces may result from valve centering springs, for example, or from hydraulic pressures which act on a piston. In order that such controls remain securely held in a fixed predetermined position despite the presence of such reactive forces, it has been manifestly necessary to provide such controls with either friction means, or some form of detenting or latching means which oppose the reactive forces and prevent undesired movement of the control. Machine vibration also sometimes tends to cause undesired control movement. In some applications it is possible to utilize electrical controls, such as rheostats, for example, which receive no reactive forces tending to displace them from a selected position (although vibration sometimes affects electrical controls), but in many applications it is desirable that electrical controls not be used, or that substantial reactive forces be applied to a manual control to aid the operator to control the machine smoothly, by giving the operator a "feel" indicating the instantaneous control position, so that the operator need not look at the control to determine its condition or position. Simple friction means are frequently undesirable in that they make it difficult for the operator to move the control from one position to another, and also often undesirable in that friction often results in wear of parts, so that various parts must be frequently adjusted or replaced. Most prior art detenting or latching means of which I am aware are often deficient either in that they require additional operator force to compress springs or to overcome friction in order to release the controls, or in that the manual force required to release them varies greatly with the amount of reactive force applied to the elements which they position. One object of the present invention is to provide an improved manual control for positioning an element to a desired translational or angular position which will hold the control securely in an operator-selected position, but in which the amount of operator force required to release the control from a given predetermined position may be made substantially independent of the amount of reactive force being applied to the control mechanism by the machine element which the manual control serves to position.

The present invention finds particular utility in a number of material-handling applications, such as where manual hydraulic controls are provided to enable an operator to control a hoist or other mechanism on a lift truck. In such applications large hydraulic pressures are commonly utilized, so that substantial reactive forces may tend to cause unwanted control movement. It is frequently desirable in such applications that the manual controls not require lengthy levers, in order that the overall control mechanisms occupy a minimum amount of space. It is also usually necessary or desirable in such applications that a manual control which is latchable in one or more predetermined positions also be controllable over one or more ranges of positions in which the control does not latch, and in which the operator can feel the amount of the reactive forces, in order that the operator be enabled to exercise proportional or continuous control of the machine over certain ranges of forces or speed or other conditions, and it is another object of the present invention to provide an improved manual control which meets such requirements.

Where a manual control is operable over one or more ranges in a continuous manner with reactive forces discernible to the operator and also latchable at one or more predetermined positions, it is desirable, as the operator moves the control to a latchable position, that he be informed by the feel of the control, that the control has latched in position, and conversely, that he be informed by the feel of the control that it has unlatched when he unlatches the control from a latching position. It is another object of the invention to provide an improved manual control which provides such a feel to the operator.

Another object of the invention is to provide a manual control latching means which is rugged, simple and reliable, and economical to construct.

Other objects of the invention will in part be obvious and will, in part, appear hereinafter.

The invention accordingly comprises the features of construction, combination of elements, and arrangement of parts, which will be exemplified in the constructions hereinafter set forth, and the scope of the invention will be indicated in the claims.

For a fuller understanding of the nature and objects of the invention reference should be had to the following detailed description taken in connection with the accompanying drawings, in which:

FIG. 1 is a geometrical mechanical schematic diagram useful in understanding some underlying principles of the invention.

FIG. 2 is a side view of one form of manual control constructed in accordance with the invention.

FIG. 5 is a schematic diagram illustrating one manner in which the device of FIGS. 2–4 may be arranged to control the hoisting of a load carriage on a fork lift truck.

Figure 4:
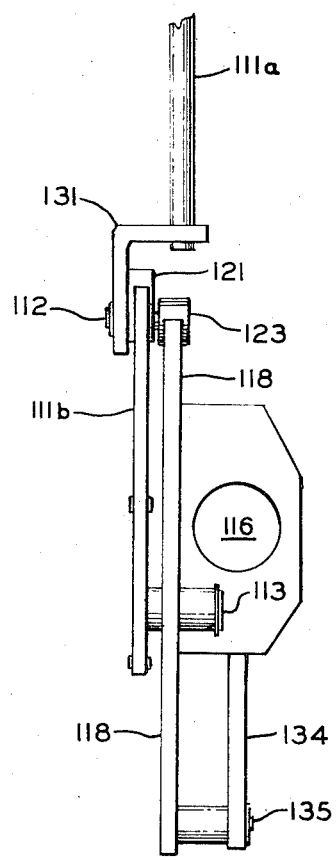
FIG. 4 is a view taken at lines 4—4 in FIG. 2.

Basic principles of various aspects of the invention may be better understood by considering the elementary mechanical schematic diagram of FIG. 1. A manual control is shown at a central position I as comprising a handle 10 mounted on one end of an articulated or two-section arm 11a, 11b, the two rigid rod portions of which are pivotally connected together at 12. The lower end of rod 11b is affixed to shaft 13 which is journalled in bearings (not shown) at a fixed position.

If a translational output to the controlled device is desired, a further rod is pivotally attached to arm 11b, such as at pivot point 11c, where rod 14 is shown extending to the piston 15 of a spring-centered valve or piston assembly 16. If instead a rotational output to the controlled device is desired, it may be taken from shaft 13, using gearing, a crank system, or any of a number of alternatives. Arm 11b is shown extending below shaft 13. When arm 11b is rotated about the axis of shaft 13, the portions of arm 11b above and below shaft 13 will move in mutually opposite directions, of course. Translatory outputs may be taken from the lower end of arm 11b, as from pivotally connected arm 29. The amount by which valve piston 15 is moved for a given movement of arm 11b may be determined by adjustment of the distance from shaft 13 at which output arm 14 is connected to arm 11b.

Fixed stationary with respect to shaft 13 is cam plate 18, which is shown provided with a plurality of circular or arcuate edges 18a, 18b, 18c all centered about the axis of shaft 13. The pivotal connection 12 joining arms 11a and 11b is shown located at a radial distance from shaft 13 corresponding to that of arcuate edge 18a of cam plate 18, but it may be located at a lesser radial distance. A pair of arms 21, 22 rigidly attached to upper arm 11a and extending on opposite sides thereof each carry a cam follower or roller 23 or 24, which bears against edge 18a of cam plate 18. With control handle 10 in the centered position shown at I FIG. 1, it will be seen that the seating of rollers 23 and 24 against cam face 18a constrain upper arm 11a to a predetermined angle with respect to lower arm 11b, the predetermined angle being shown specifically as zero degrees at I in FIG. 1, so that arm 11a is parallel to arm 11b. It will be apparent that a different predetermined angle could be provided, if desired, by variation of the fixed angle (shown as 90 degrees) between arms 21, 22 and upper arm 11a.

As the control handle 10 is moved slightly leftwardly or rightwardly from the centered position shown at I, it will be apparent that lower arm 11b will rotate slightly counterclockwise (CCW) or clockwise (CW) about the axis of shaft 13, and that rod 14 will position piston 15 leftwardly or rightwardly in valve assembly 16. If forces caused by centering springs (not shown) and/or hydraulic pressures within assembly 16 tend to impede or aid translation of piston 15, it will be seen that a portion of such forces will be felt by the operator as he moves handle 10. Control handle 10, arms 11a and 11b and cam follower rollers 23 and 24 are also shown moved to a variety of other positions in FIG. 1, the other positions being shown at II, III and IV.

Now assume that the operator urges control handle 10 continuously leftwardly from central position I against a force within assembly 16 which tends to urge the handle in the opposite direction. It will be seen that upper arm 11a will remain parallel to lower arm 11b until roller 23 reaches the left end of cam face 18a, but then further leftward urging of handle 10 causes upper arm 11a to suddenly pivot counterclockwise by a fixed amount as roller 23 rides down radially-extending edge 18d of cam 18 to seat against edge 18b. The sudden large counterclockwise movement of handle 10 with no appreciable increase in pressure on the handle clearly indicates to the operator that he has reached a latching position.

Now assume that the operator releases control handle 10 with the mechanism shown in the position indicating at II in FIG. 1. The reactive force urging rod 14 rightwardly and lower arm 11b clockwise will be seen to urge roller 23 precisely normal to radially-extending face 18d, and no matter the magnitude of the reactive force, no component of the reactive force tends to move roller 23 upwardly, and the reactive force holds the control handle and lower arm 11b securely in the positions shown at II in FIG. 1, even if pivotal connection 12 is assumed to have no appreciable friction.

When the operator wishes to return the control from position II to some position around position I or to position IV, for example, as he urges control handle 10 rightwardly, or clockwise from the position shown at II. It will be seen that roller 23 will initially travel radially outwardly along cam face 18d. Inasmuch as the reactive force urges roller 23 perpendicular to face 18d, the reactive force does not affect such initial movement of the control handle, and because the operator control handle movement urges roller 23 outwardly with a lever arm advantage of 1/b, it will be seen that roller 23 will be urged outwardly with very little operator effort, and upper arm 11a and control handle 10 will move clockwise. As the center of roller 23 passes the outer edge or corner of face 18d, the reactive force will suddenly begin to aid clockwise motion of the control handle and arm 11a, thereby suddenly increasing the clockwise rotation of those elements, so that upper arm 11a tends to snap to a position parallel to lower arm 11b where both rollers 23 and 24 engage face 18a of cam 18. The change in control handle rotation for a given amount of effort as the handle is moved is readily discernible by the operator.

With face 18d of cam 18 extending precisely radially from the axis of shaft 13, reactive forces from the controlled device act normal to face 18d and tend to have no effect on radial movement of roller 23 along face 18d. If face 18d is not formed precisely radially, but instead extends at an angle (shown as $\alpha$) to the radial direction, a component of the reactive force proportional to the sine of the angle $\alpha$ will be seen to urge roller 23 generally radially inwardly, thereby holding roller 23 even more securely in the corner formed by faces 18b and 18d, and the greater angle $\alpha$, the greater the inward force on roller 23 will be. Such an arrangement is desirable in applications where vibration or inertia of upper arm 11a might cause roller 23 to accidentially dislodge from position II. Such an arrangement does require that the operator initially apply a slightly increased clockwise force when returning the control from position II to the central range of positions, but with a small angle $\alpha$, the 1/b lever advantage of upper arm 11a still allows handle 10 to move clockwise very easily to unlatch the mechanism, even if the reactive force is very great.

Now assume with the control in position II that the operator urges the control further leftwardly toward position III. The reactive force will be seen to oppose such further leftward movement of the control. Roller 23 will be seen to ride along face 18b, and upper arm 11a will remain at the same angle relative (shown as $\beta$) to lower arm 11b as it had when the mechanism was locked in position at position II. If the operator releases handle 10 when roller 23 is positioned somewhere along face 18b, reactive forces from the controlled device will be seen to tend to return the mechanism to position II and lock it in place at position II. If, however, the operator moves the control further leftwardly, eventually roller 23 will roll off the left edge of face 18b, and handle 10 will again experience a rapid readily discernible counterclockwise rotation with no appreciable force being required, as roller rides down face 18e which also may extend radially from the axis of shaft 13 (or at a slight angle, as explained above in connection with angle $\alpha$). Cam 18 is also shown with a further radially-extending face 18f which serves as a stop to prevent further counterclockwise movement of control handle 10. With roller 23 situated in the slot defined by faces 18e and 18f of cam 18, reactive forces from the controlled device again will be seen to act normal to face 18e so that they do not tend to unlatch the control from position III, but a small clockwise force exerted on handle 10 still enables the operator to unlatch the device very easily.

FIG. 1 illustrates a bi-directional control, and assumes that the controlled device applies an oppositely-acting reactive force when the control handle is moved rightwardly from central position I instead of leftwardly. From the symmetry in FIG. 1 it will be apparent that the functions of rollers 23 and 24 will be interchanged when the control handle is moved rightwardly toward a position such as that shown at IV in FIG. 1, and no detailed description of righthand motion to position IV is deemed necessary. While cam followers 23 and 24 have been described as comprising rollers, it will be apparent that sliding cam followers may be used instead of rollers in applications where the difference between rolling and sliding friction is not critical. It will be appreciated that reactive force from the controlled device may affect sliding friction along radial faces such as 18d and 18e considerably more that it effects rolling friction.

The system of FIG. 1 illustrates a bi-directional control having two latching positions (II and III) on one side of a central range of positions, and one latching position on the other side of the central range of positions. It will be apparent that the techniques of FIG. 1 are readily applicable to unidirectional controls, and that the number of latching positions may be varied, whether the control is bi-directional. The magnitude of the discrete change in angle between upper arm 11a and lower arm 11b as the control is put into or removed from a latching position will be seen to depend upon the radial distance between adjacent arcuate levels cam 18, i.e. the length of radial faces such as 18d and 18f the distance of pivot point 12 from shaft 13, the distances of rollers 23 and 24 from pivot connection 12, and the diameters of the rollers.

If rollers 23 and 24 are provided with smaller diameters than those shown, for example, it will be apparent that cam faces 18d and 18e may be provided with shorter lengths to provide lesser sudden angular changes between arms 11a and 11b as the control is switched between latching and unlatched conditions. It will be apparent that different generally radially-extending faces at different latching positions may be given different lengths and different deviations from a precisely radial direction in order to intentionally vary the amount of operator force required to unlatch the control at different latching positions.

Figure 3:
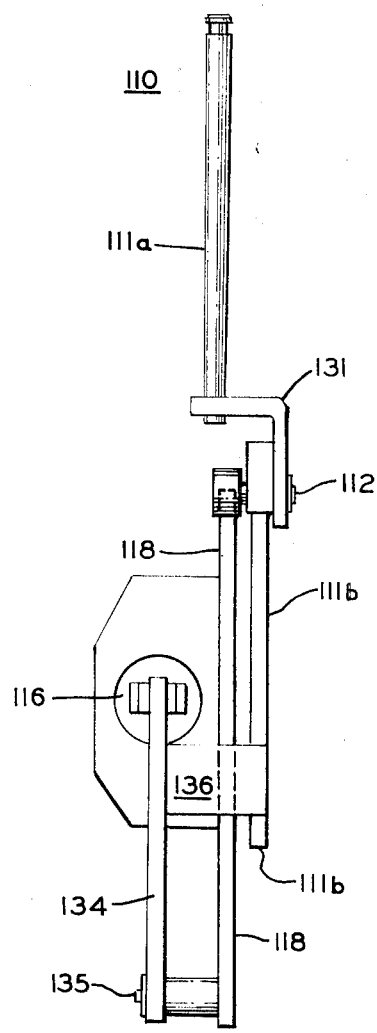
FIG. 3 is a view taken at lines 3—3 in FIG. 2.

FIG. 2-4 illustrate one form of the invention as it was constructed for use with a load lifting control on a fork lift truck. Parts generally corresponding functionally to items shown in the schematic diagram of FIG. 1 are given corresponding numbers with the numeral 1 added as a prefix. The control shown in FIGS. 2-4 is intended to latch in only a single position, shown in dashed lines in FIG. 2, and hence cam plate 118 is provided with a single depression defined by sides 118d and 118f. Cam plate 118 is fixedly mounted on the truck (not shown) within easy reach of the operator. Control handle 110 includes a rigid arm 111a, the lower end of which is welded to an angle piece 131. A stub shaft 112 extending from arm 111b near its upper end passes through are 111a and pivotally conncets arms 111a and 111b and a stub shaft 113 extending from arm 111b near its lower end passes through a bearing 132 provided in cam plate 118.

A laterally-extending arm 121 welded to angle piece 131 carries cam follower roller 123. As control handle 110 is moved leftwardly from the centered or neutral position shown in solid lines at I in FIG. 2, it will be appreciated that roller 123 eventually will reach edge 118d and latch the control mechanism into the position shown in dashed lines at II in FIG. 2. If control handle 110 is instead moved rightwardly in FIG. 2 from the neutral position, cam follower roller 123 will ride along face 118a of cam plate 118 but the mechanism will not latch. The rotation of lower arm 111b as handle 110 is moved between the positions shown in dashed lines at II and III will be understood. FIG. 2 illustrates a modified arrangement for coupling the rotation of arm 111b to the controlled device, which is shown in FIGS. 2-4 as comprising a hydraulic piston assembly 116. Rigid arm 114 extending from assembly 116 is pivotally connected to one end of arm 134, the other end of which is pivotally connected to cam plate 118 to rotate about stub shaft 135. A projecting piece 136 welded to arm 134 secures the ends of two lengths of roller chain 137 and 138, the other ends of which are fastened to arm 111b on opposite sides of shaft 113. The lengths of roller chain are arranged so that both are taut when the control is in its neutral position I. As control handle 10 is moved leftwardly toward position II, the latching position, upper chain 137 slackens and lower chain 138 pulls arm 134, rotating arm 134 clockwise, and urging arm 114 and the piston (not shown) within assembly 116 rightwardly as viewed in FIG. 2. When control handle 10 is moved rightwardly toward position III, upper chain 137 pulls arm 134 clockwise and lower chain 138 slackens. Thus it will be seen that motion of control handle 110 in either direction from the neutral position shown operates to provide rightward movement of the piston within assembly 116. Though chains 137 and 138 are shown connected at equal distances from shaft 113, they may be connected at unequal distances if different amounts of piston movement are desired from control handle movements in opposite directions.

It may be noted that, unlike the bi-directional arrangement shown in FIG. 1, a single cam follower 123 is provided in FIG. 2. Where a single cam follower is provided, it is necessary to provide additional means to limit rotation in one direction of the control handle (10 or 110) relative to the lower arm (11a or 111a). In the device of FIG. 2 the upper end of the lower arm 111b is provided with a shaped surface which acts as such a limit. One corner of arm 111b is cut off as shown at 139, to allow piece 121, and hence control handle 110, to rotate counterclockwise relative to arm 111b when roller 123 enters the slot defined by edges 118d and 118f of cam plate 118, but the square or right-angle portion 140 of the end of arm 111b acts as a stop to limit clockwise rotation of piece 121 and handle 110 relative to arm 111b, a rearward portion of piece 121 seating against portion 140, as shown at position I in FIG. 2.

In one exemplary use of the device of FIGS. 2-4 on an actual lift truck, as shown schematically in FIG. 5, control handle 110 was arranged to control the position of a piston within a piston-cylinder assembly 116, which in turn controlled the swash plate 31 in a hydraulic pump P through a spring-loaded slave piston-cylinder 32, with the hydraulic pump P arranged to supply fluid to a lift cylinder assembly 33 arranged to raise the load carriage 34 on the truck. The centered or neutral position of handle 110 was arranged to position the pump swash plate so that a very small fluid flow resulted when motor M was energized to run the pump. The forward or latching position of the control handle positioned the swash plate so as to permit a predetermined increased fluid flow when the pump was driven by the motor. Runing and stopping of the motor when the control handle was in either the neutral position or the latched forward position was controlled by a momentary pushbutton switch PB conveniently mounted on the truck travel or propulsion control 35, and hence the operator was enabled to provide a predetermined very slow lifting speed or a predetermined medium lifting speed while the truck was travelling, by positioning handle 110 to either the centered position or the latched forward position. A limit switch SW was arranged to be closed by arm 111b whenever the control handle 110 was moved rearwardly (toward position III in FIG. 2), so that the fast ranges of lifting speed provided by rearward movement of the control handle (between positions I and III in FIG. 2) did not require depression of pushbutton PB. Although shown in FIG. 5 for sake of simplicity as directly controlling the running of motor M, switches PB and SW actually were connected to control a relay contactor which controlled the running of motor M.

It will be apparent that the manual control of the invention is readily applicable to a wide variety of other applications.

It will thus be seen that the objects set forth above, among those made apparent from the preceding description, are efficiently attained, and since certain changes may be made in the above constructions without departing from the scope of the invention, it is intended that all matter contained in the above description or shown in the accompanying drawings shall be interpreted as illustrative and not in a limiting sense.

The embodiment of the invention in which an exclusive property or privilege is claimed are defined as follows:

1. A manual control latching mechanism comprising, in combination: shaft means rotatable about a first axis; a first rigid arm affixed to said shaft means to rotate said first rigid arm in a plane perpendicular to said first axis; a rigid conrtol handle having one of its ends pivotally connected to one end of said first rigid arm to allow said control handle to rotate with respect to said first rigid arm about a second axis parallel to said first axis; cam means having an arcuate face concentriclly located with respect to said first axis at a first radial distance from said first axis, said arcuate face terminating in an edge which extends substantially radially toward said first axis to a second face at a different radial distance from said first axis; cam follower means attached to said control handle and spaced from said end of said control handle, said cam follower means comprising roller means journalled to rotate about an axis parallel to said first and second axes and adapted to engage said arcuate face of said cam means through a range of movement of said control handle and to engage said edge and said second face of said cam means at the end of said range of movement, and a controlled device connected to be positioned by rotation of said first rigid arm about said first axis.

2. A mechanism according to claim 1 having a second rigid arm pivotally connected to said first rigid arm at a predetermined distance from said first axis, said controlled device being connected to be translated by translation of said second rigid arm.

3. A mechanism according to claim 1 in which said controlled device is connected to said shaft means to be rotated by rotation of said first rigid arm.

4. A mechanism according to claim 1 in which the length of said first rigid arm between the axis of said shaft means and said one of the ends of said first rigid arm is equal to or less than said first radial distance.

5. A mechanism according to claim 1 in which said cam follower means is spaced from said end of said control handle at a first distance which is less than the length of said rigid control handle.

6. A mechanism according to claim 1 in which said controlled device comprises a hydraulically-operated device which applies varied forces to said control handle at difference positions of said cotrol handle.

7. A mechanism according to claim 1 in which said controlled device comprises hydraulic control means connected to control the supply of hydraulic fluid to a piston-cylinder connected to raise the load carriage of a fork lift truck.

8. A manual control latching mechanism comprising, in combination: shaft means rotatable about a first axis; a first rigid arm affixed to said shaft means to rotate said first rigid arm in a plane perpendicular to said first axis; a rigid control handle having one of its ends pivotally connected to one end of said first rigid arm to allow said control handle to rotate with respect to said first rigid arm about a second axis parallel to said first axis; cam means having a first arcuate face concentrically located with respect to said first axis at a first radial distance from said first axis and a second arcuate face concentrically located with respect to said first axis at a second radial distance from said first axis, said first arcuate face terminating in an edge which extends substantially radially toward said first axis to said second arcuate face, said second arcuate face terminating in an edge which extends substantially radially toward said first axis to a third face at a different radial distance from said first axis; cam follower means attached to said control handle and spaced from said end of said control handle, said cam follower means being adapted to engage said first arcuate face of said cam means through a first range of movement of said control handle, to engage said second arcuate face of said cam means through a second range of movement of said control handle, and to engage said third face of said cam means at the end of said second range of movement; and a controlled device connected to be positioned by rotation of said first rigid arm about said first axis.

References Cited

UNITED STATES PATENTS

| | | | |
|---|---|---|---|
| 84,710 | 12/1868 | Robinson | 74—524 |
| 803,495 | 10/1905 | Lund | 74—536 |
| 1,158,246 | 10/1915 | Lavender et al. | 74—536 |
| 2,277,966 | 3/1942 | Franzkowiak | 74—536 |
| 2,653,841 | 9/1953 | Davies et al. | 187—9X |
| 3,005,562 | 10/1961 | Shaffer | 187—9X |
| 3,240,371 | 3/1966 | Conrad | 187—9X |
| 3,295,391 | 1/1967 | Ernst et al. | 74—536 |

FOREIGN PATENTS

| | | | |
|---|---|---|---|
| 143,054 | 1920 | Great Britain | 74—523 |

FRED C. MATTERN, JR., Primary Examiner

F. D. SHOEMAKER, Assistant Examiner